United States Patent [19]

Mortoly

[11] 4,374,165

[45] Feb. 15, 1983

[54] LIQUID ADHESIVE APPLICATOR

[75] Inventor: John L. Mortoly, Poughkeepsie, N.Y.

[73] Assignee: James L. Taylor Mfg. Co., Poughkeepsie, N.Y.

[21] Appl. No.: 277,227

[22] Filed: Jun. 25, 1981

[51] Int. Cl.$^3$ .......................... B05D 1/18; C09J 5/02; B05G 1/00

[52] U.S. Cl. .......................... 427/430.1; 118/200; 156/307.3; 427/440

[58] Field of Search .......................... 118/200; 427/430.1, 427/440; 156/307.3

[56] References Cited

U.S. PATENT DOCUMENTS

| | | | |
|---|---|---|---|
| 213,453 | 3/1879 | Ruger et al. | 118/429 X |
| 1,943,647 | 1/1934 | Weller | 118/425 X |
| 1,959,341 | 5/1934 | Bowlen | 118/200 |
| 2,245,657 | 6/1941 | Eppler | 118/200 |
| 2,293,747 | 8/1942 | Koch | 118/421 |

*Primary Examiner*—Michael R. Lusignan
*Attorney, Agent, or Firm*—Weingram & Klauber

[57] ABSTRACT

A method and apparatus for applying liquid adhesive to a work-piece. A reservoir containing the liquid adhesive is moved relative to a stationary perforated support member immersed in the adhesive to expose the support member. Excess liquid adhesive drains through apertures in the support member. The work-piece is placed in contact with the support member for application of the adhesive thereto. After the work-piece is removed from the support member the reservoir is allowed to move back to again immerse the support member. The reservoir is preferably resiliently mounted and connected to a foot-treadle which when depressed moves the reservoir downwardly, exposing the support member.

12 Claims, 7 Drawing Figures

10
11
12
13
14
15
16
17
18
19
20
21
22
23
27
31
41
5a
5b

LIQUID ADHESIVE APPLICATOR

BACKGROUND OF THE INVENTION

1. Field of the Invention

This invention relates generally to applicators and more specifically to a device for applying liquid adhesive to a work-piece.

2. In the furniture industry, for example, work-pieces in the form of lengths of wood are joined together by an adhesive, often a liquid glue. In the past, to facilitate applying liquid glue to pieces to be joined, the pieces or portions of the pieces immersed into the liquid adhesive before securing them together. Thus, the work-pieces to be glued were placed on a device which moved them into and out of an adhesive bath to dip a succession of work-pieces into the adhesive. However, such dipping devices have a disadvantage in that the work piece is often covered with an excess of adhesive which is difficult to remove and which excess adhesive also causes unnecessary sticking of the item during the subsequent manufacturing operations.

An example of an earlier device capable of applying liquid adhesive in U.S. Pat. No. 1,943,647 to Weller which discloses a pad, that presumably can support a work-piece, lowered into a fluid by depressing a platform supported by springs.

Another known device is U.S. Pat. No. 1,959,341 to Bowlen, which discloses the transfer of glue from a reservoir to a fixed glue applicator plate by means of an oscillating applicator plate and then placing the work-piece in contact with the fixed applicator plate.

U.S. Pat. No. 2,293,747 to Koch discloses an apparatus for coating the edges of wood strips which are positioned by rollers in a glue tub. The level in the glue tub is held constant by dipping the glue tub into a lower tub by means of a treadle.

Also of interest is U.S. Pat. No. 213,453 to Ruger which discloses a device for applying powdered sugar on confections using a flexible bottom that, when rebounded from pressure by a plate, throws powdered sugar onto the surface of items fastened to the underside of the plate.

All of the devices discussed suffer from the disadvantages which the present invention seeks to overcome.

SUMMARY OF THE INVENTION

In accordance with the teachings of the present invention, a stationary application support member is immersed in a reservoir containing liquid adhesive. To apply adhesive to selected surface portions of a work-piece, the reservoir is moved away from the support member, for example by lowering the reservoir, to expose the support member. Excess liquid adhesive drains through apertures in the support member, and the work-piece is placed in direct contact with the support member to coat selected surface portions with adhesive. After the work-piece is removed from the support member, the reservoir is returned, in this case raised, to immerse the support member.

In a preferred embodiment, the reservoir is resiliently mounted and is moved downwardly away from the support member by depressing a foot operated treadle. After the work piece is brought in contact with the support member to apply the adhesive to the work piece, the foot treadle is released, and the reservoir returns to its original position at which the support member is to again immerse the support member in the liquid glue.

Accordingly, it is a principal object of the present invention to provide a device and method for applying a liquid adhesive to selected portions of the surface of a work-piece without causing excess adhesive to be applied.

A further object of the present invention is to provide a simplified method of applying a liquid adhesive to selected surface portions of a work-piece.

A still further object of the present invention is provide a simplified method to facilitate the application of liquid adhesive to selected surface portions of a work-piece and transfer of the work-piece for assembly.

Yet another object of the present invention is to provide a simplified method of applying glue to selected surface portions of a work piece, which is fast.

Yet another object of the present invention is to provide a simplified method of applying glue to selected surface portions of a work piece, which is relatively easy.

Yet another object of the present invention is to provide a simplified method of applying glue to selected surface portions of a work piece, which does not require removal of excess glue.

Yet another object of the present invention is to provide a simplified method of applying glue to selected surface portions of a work piece, which uses a minimum of liquid glue.

Yet antoher object of the present invention is to provide a simplified method of applying glue to selected surface portions of a work piece, which does not require dipping the work into a bath of liquid glue.

Still another object of the present invention is to provide apparatus for applying liquid glue to selected surface portions of a work piece which is relatively simple.

Still another object of the present invention is to provide apparatus for applying liquid glue to selected surface portions of a work piece which is easy to operate.

Still another object of the present invention is to provide apparatus for applying liquid glue to selected surface portions of a work piece which is reliable.

Still another object of the present invention is to provide apparatus for applying liquid glue to selected surface portions of a work piece which is durable in operation.

Still another object of the present invention is to provide apparatus for applying liquid glue to selected surface portions of a work piece which is of relatively simple and economical construction.

Still another object of the present invention is to provide apparatus for applying liquid glue to selected surface portions of a work piece which doesn't require immersing the work piece in a liquid bath.

Still another object of the present invention is to provide apparatus for applying liquid glue to selected surface portions of a work piece which doesn't use excess glue.

Still another object of the present invention is to provide apparatus for applying liquid glue to selected surface portions of a work piece which minimizes the work steps required.

Still another object of the present invention is to provide apparatus for applying liquid glue to selected surface portions of a work piece which facilitates storing of the liquid glue without deterioration or hardening.

Still another object of the present invention is to provide apparatus for applying liquid glue to selected surface portions of a work piece which enables sealing of the liquid adhesive container during periods of non use.

Still another object of the present invention is to provide apparatus for applying liquid glue to selected surface portions of a work piece which reduces the build up of glue on the working surfaces of the apparatus.

The foregoing and further objects will appear from the following illustrative embodiment, the novel features of the invention being pointed out in the claims.

BRIEF DESCRIPTION OF THE DRAWING

The invention will be described in connection with an illustrative embodiment shown in the attached drawing in which identical parts bear the same reference numerals and in which.

Figures 1, 2, 3, 4:
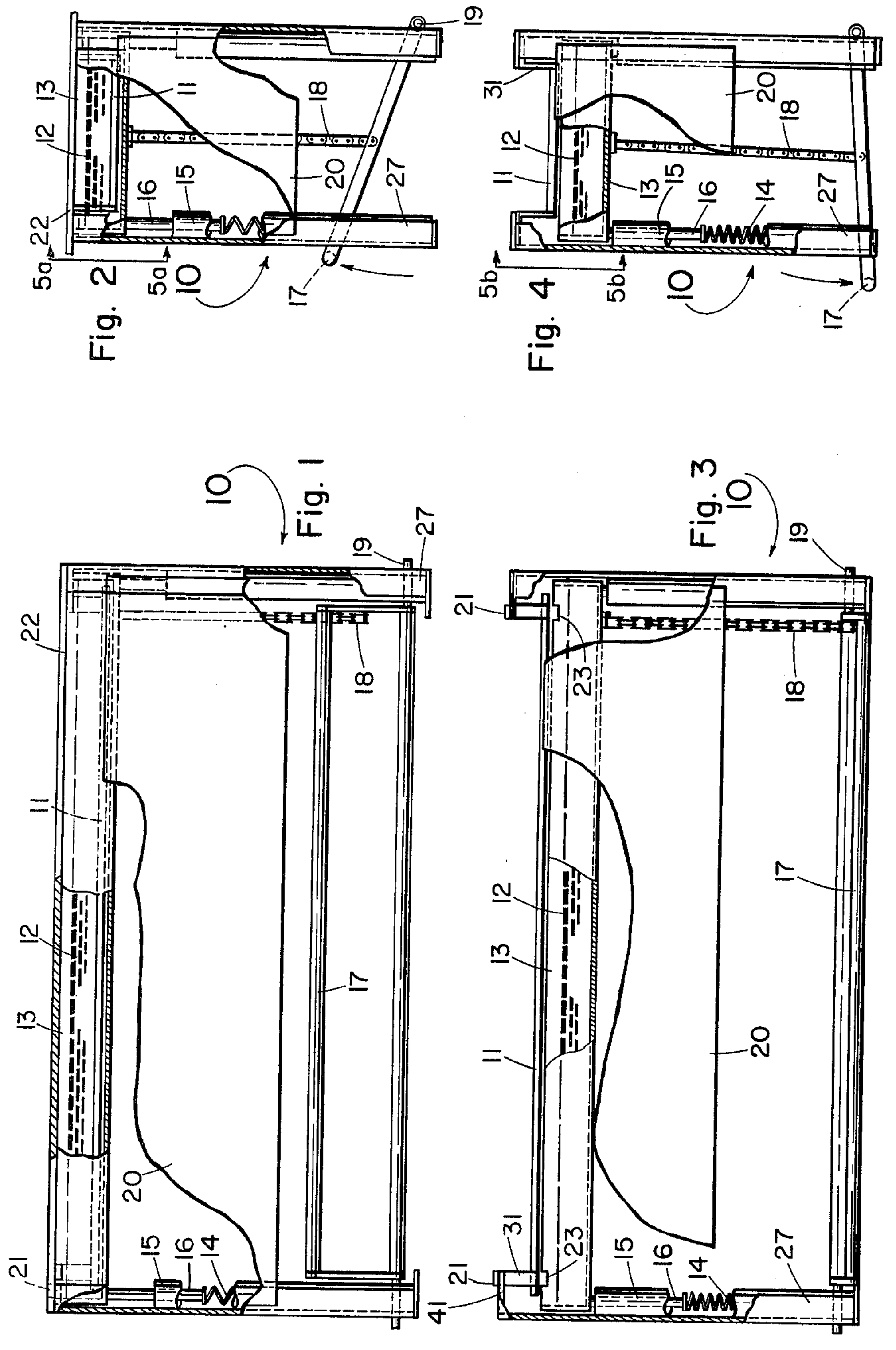
FIG. 1 is a side elevational view, partly in section, of the applicator according to the invention with the adhesive reservoir in a raised position.
FIG. 2 is an end elevational view, partly in section, of the applicator shown in FIG. 1.
FIG. 3 is a side elevational view, partly in section, of the applicator with the adhesive reservoir in a lowered position.
FIG. 4 is an end elevational view, partly in section, of the applicator shown in FIG. 3.

FIG. *5a* is a partial view of the support member taken along lines *5a–5a* of FIG. 2.

FIG. *5b* is a partial view of the support member taken along lines *5b–5b* of FIG. 4.

Figure 6:
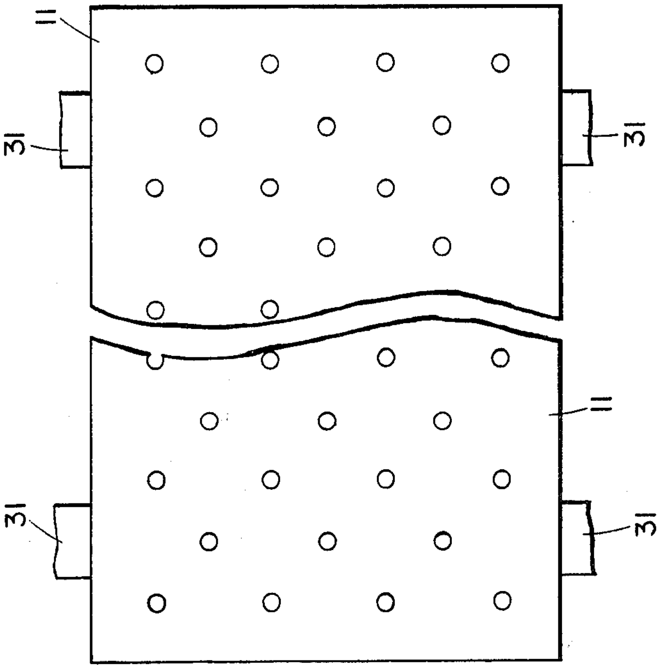
Figure 5A:
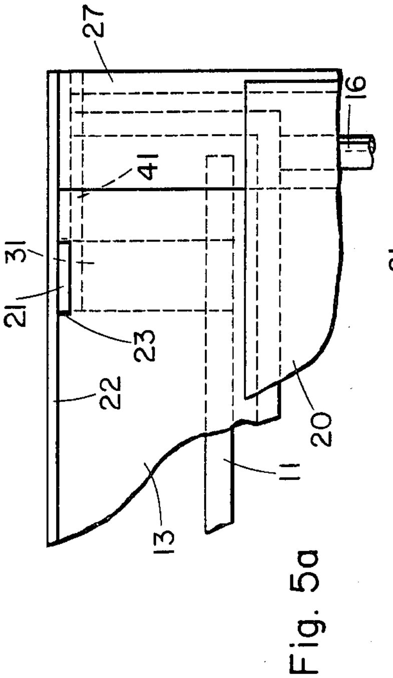
Figure 5B:
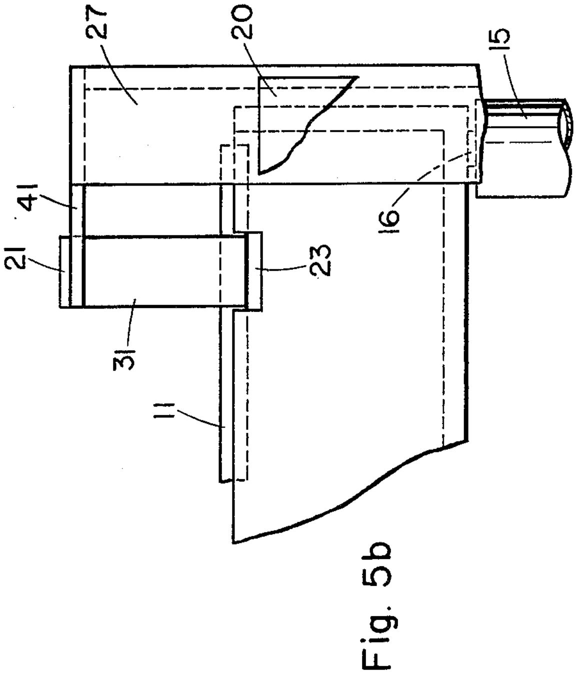

FIG. 6 is a plan view of the applicator support member.

DESCRIPTION OF THE PREFERRED EMBODIMENT

The applicator shown in the Figures of the drawing comprises a frame 10 supporting a support member applicator in the form of a perforated plate 11, fixed to the ends 41 of legs 27 of frame 10 by means of a horizontal bracket 21 connected to a vertical bracket bracket 31. A liquid reservoir 13 is positioned within the ends of the frame 10 and movably supported in the vertical direction upon resilient legs 15 which include springs 14 connected to rods 16.

Reservoir 13 is drawn down to expose plate 11 by depressing a foot treadle 17 connected to the underside of reservoir 14 via chain 18. The foot treadle 17 is pivotally connected at 19 to the leg 27 of frame 10.

The reservoir is prevented from rising above the level of the frame by means of the upper portion 21 of the brackets holding the support member 11. The travel of the reservoir is carefully controlled. Notches 23 in the upper edge of the reservoir 13 are approximately equal in depth to the thickness of the bracket 21. Therefore, when reservoir 13 is in the raised position, the top of brackets 21 and top of reservoir 13 will be in alignment. This allows a sealing board 22 to be placed over the top of the reservoir 13 while being supported by horizontal brackets 21 of frame 10. The close fit of the board 22 with the top of the reservoir 13 limits or seals the amount of air that the glue is exposed to, preventing hardening of the glue during periods of non-use.

When reservoir 13 is in the upper position, there is a space between support member 11 and the bottom of the reservoir. This space allows wood chips, particles of hardened glue or other items which may find their way into the reservoir during use of the apparatus to fall out of the way and not interfere with the operation of the device.

A skirt 20 is provided around the sides of the device to prevent interferences with the travel of reservoir 13.

OPERATION

The device operates in a straight forward manner. Reservoir 13 is filled to an appropriate level 12 with liquid glue 12. The level of the glue is above the level of the support member 11.

To apply glue to a portion of a work piece, the foot treadle 17 is depressed, bringing the reservoir down sufficiently to expose support member 11. The perforations in support member 11 as shown in FIG. 6 allow excess liquid glue to drain from the support member.

The dry work piece is then placed in contact with the wet support member to transfer the glue and coat the part of the work piece in contact with the support member. The work piece is then removed, and the foot treadle released, allowing the reservoir to rise until springs 14 urge the top of slots 23 of reservoir 13 to a stop against bracket 21. The liquid glue 12 will then once again extend above and immerse support member 11.

It should be noted that the support member is always submerged when not actually applying liquid glue. Therefore, there is a reduced tendency to build up semi-hardened glue on the applicating surfaces of the devices during periods of inactivity or extended use.

Similarly as mentioned previously, sealing board 22 can be used to limit the hardening of any glue remaining in reservoir 13 during periods of inactivity.

What is claimed is:

1. A liquid adhesive applicator comprising:

a movable reservoir for storing a quantity of a liquid adhesive, a stationary adhesive-resistant perforated support member immersed in the liquid adhesive; and means to move the reservoir relative to the support member to withdraw the liquid adhesive from the support member, excess liquid adhesive draining through apertures in the support member, the support member thereby being adapted to receive a work-piece to which adhesive is applied.

2. A liquid adhesive applicator as claimed in claim 1 wherein the reservoir is resiliently supported with the stationary support member within the reservoir, the reservoir being movable away from the support member.

3. A liquid adhesive applicator as claimed in claim 1 wherein the reservoir is supported by springs.

4. A liquid adhesive applicator as claimed in claim 1 wherein the reservoir is connected to a manually depressable member.

5. A liquid adhesive applicator as claimed in claim 1 wherein the manually depressable member is a foot-treadle.

6. A liquid adhesive applicator as claimed in claim 1 further comprising:

support means for said stationary support member;

stop means extending from said stationary support means to coact with and limit movement of said reservoir means.

7. A liquid adhesive applicator as claimed in claim 6 wherein sealing board means is adapted to coact with said reservoir means and said stop means to seal said reservoir.

8. A method of applying liquid adhesive to a work-piece comprising the steps of:

immersing a stationary support member in a reservoir containing a liquid adhesive;

moving the reservoir relative to the support member to expose the same;

allowing excess liquid adhesive to drain through the apertures in the support member, and;

thereafter placing the work-piece in contact with the support member to apply adhesive thereto.

9. A method as claimed in claim 8 wherein the reservoir is lowered relative to the support plate to expose the same.

10. A method as claimed in claim 9 wherein the reservoir, after removal of the work-piece, is raised to immerse the support member.

11. A method as claimed in claim 9 wherein the reservoir is lowered manually.

12. A method as claimed in claim 9 wherein the reservoir is raised by a resilient mounting.

* * * * *